United States Patent
Austin et al.

(10) Patent No.: US 6,474,931 B1
(45) Date of Patent: Nov. 5, 2002

(54) DIRECTIONAL DRILLING MACHINE WITH MULTIPLE POCKET ROD INDEXER

(75) Inventors: Gregg Austin; Scott Rempe, both of Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 09/602,322

(22) Filed: Jun. 23, 2000

(51) Int. Cl.[7] .............................................. B65G 59/06
(52) U.S. Cl. ................. 414/798.1; 414/797.8; 414/798; 414/745.7
(58) Field of Search ............................ 414/745.7, 798, 414/798.1, 797.8; 221/233, 236, 266

(56) References Cited

U.S. PATENT DOCUMENTS

| | | |
|---|---|---|
| 3,984,007 A | 10/1976 | Birdwell |
| 4,002,248 A | 1/1977 | Moller |
| 4,632,618 A | 12/1986 | Issakainen |
| 5,556,253 A | 9/1996 | Rozendaal et al. |
| 5,607,280 A | 3/1997 | Rozendaal |
| 5,687,804 A | 11/1997 | Lappalainen et al. |
| 6,085,852 A | 7/2000 | Sparks et al. |
| 6,179,065 B1 * | 1/2001 | Payne et al. .................. 175/24 |

FOREIGN PATENT DOCUMENTS

| | | |
|---|---|---|
| DE | 199 26 055 A1 | 12/2000 |
| EP | 0 984 132 A2 | 3/2000 |

OTHER PUBLICATIONS

Vermeer Manufacturing Company's 1995 D–50 Navigator Parts Manual.
Vermeer Manufacturing Company'1996 D24/40 Navigator Parts Manual.
Exhibit A: pp. 35–11 to 35–13 of Vermeer Manufacturing Company's 1996 D24/40 Navigator Operator's Manual.
Exhibit B: Drawing showing exploded view of a rod selector used on Vermeer Manufacturing Company's D24/40A Navigator.

* cited by examiner

Primary Examiner—Donald P. Walsh
Assistant Examiner—Jeffrey A. Shapiro
(74) Attorney, Agent, or Firm—Merchant & Gould P.C.

(57) ABSTRACT

A horizontal directional drilling machine including a multi-column magazine, a feed structure for indexing rods to and from the magazine, and a lift unit for loading the magazine by lifting rods from the feed structure into the magazine. The lift unit includes a first portion that extends beneath all of the columns of the magazine, and a second portion that projects outward from beneath the magazine. A retaining structure is provided on the second portion for holding a rod on the second portion of the lift unit.

13 Claims, 16 Drawing Sheets

DIRECTIONAL DRILLING MACHINE WITH MULTIPLE POCKET ROD INDEXER

FIELD OF THE INVENTION

The present invention relates generally to underground drilling machines. More particularly, the present invention relates to rod loaders for feeding rods to and from horizontal directional drilling machines.

BACKGROUND OF THE INVENTION

Utility lines for water, electricity, gas, telephone and cable television are often run underground for reasons of safety and aesthetics. Sometimes, the underground utilities can be buried in a trench that is later back filled. However, trenching can be time consuming and can cause substantial damage to existing structures or roadways. Consequently, alternative techniques such as horizontal directional drilling (HDD) are becoming increasingly more popular.

A typical horizontal directional drilling machine includes a frame on which is mounted a drive mechanism that can be slidably moved along the longitudinal axis of the frame. The drive mechanism is adapted to rotate a drill string (i.e., a length of interconnected rods) about its longitudinal axis. Sliding movement of the drive mechanism along the frame, in concert with the rotation of the drill string, causes the drill string to be longitudinally advanced into or withdrawn from the ground.

In a typical horizontal directional drilling sequence, the horizontal directional drilling machine drills a hole into the ground at an oblique angle with respect to the ground surface. During drilling, drilling fluid can be pumped through the drill string, over a drill head (e.g., a cutting or boring tool) at the end of the drill string, and back up through the hole to remove cuttings and dirt. After the drill head reaches a desired depth, the drill head is then directed along a substantially horizontal path to create a horizontal hole. After the desired length of hole has been drilled, the drill head is then directed upwards to break through the ground surface. A pull-back sequence is then initiated. During the pull-back sequence, a reamer is attached to the drill string, and the drill string is pulled back through the hole. As the drill string is pulled back, the reamer enlarges the hole. It is common to attach a utility line or other conduit to the drill string so that it is dragged through the hole along with the reamer.

A typical horizontal directional drilling machine includes a rod box (i.e., a rack or magazine) for storing rods (i.e., pipes or other elongated members) used to make the drill strings. A rod transfer mechanism is used to transport rods between the drive mechanism of the directional drilling machine and the rod box. During a drilling sequence, the rod transfer mechanism transports rods from the rod box to the drive mechanism. During a pull-back sequence, the rod transfer mechanism transports rods from the drive mechanism back to the rod box.

U.S. Pat. No. 5,607,280 discloses a prior art rod handling device adapted for use with a horizontal directional drilling machine. As shown in FIG. 1, the rod handling device includes a rod box 24 having five vertical columns 41–45. Bottom ends of the columns 41–45 are open so as to define five separate discharge openings 41a–45a through which rods can be fed. A selection member 50 is mounted beneath the discharge openings 41a–45a. The selection member 50 has five pockets 41b–45b, and functions to index or feed rods 20 to and from the rod box 24. For example, during a drilling sequence, the selection member 50 indexes rods 20 from the rod box 24 to a pickup location where the rods are individually picked up and carried to a rotational drive head 16 of the drilling machine by a transfer arm 51. During a pullback sequence, the transfer arm 51 carries rods 20 from the rotational drive head 16 back to the pickup location, and the selection member 50 indexes the rods from the pickup location back beneath the rod box 24. To move the rods from the selection member 50 back into the rod box, a lift is used to push pipes upwardly into the columns 51–54 of the rod box 24.

During a typical drilling sequence, the rod box is unloaded starting with column 45. After column 45 has been unloaded, column 44 is unloaded. Thereafter, column 43, column 42 and column 41 are sequentially unloaded. During a pull-back sequence (i.e., a sequence in which rods are transferred from the drive head 16 back to the rod box 24), the columns are typically sequentially loaded starting with column 45 and finishing with column 41. Once column 45 has been loaded, a block or plug is manually inserted into pocket 45b of the selection member 50 to prevent additional rods from being loaded into column 45. Thereafter, column 44 is loaded. Once column 44 has been filled, a plug or block is manually inserted into pocket 44b of the selection member 50 to prevent additional rods from being loaded into column 44. Column 43 is then loaded. After column 43 has been loaded, a block or plug is inserted into pocket 43b of the selection member to prevent additional rods from being loaded into column 43, and column 42 is loaded. Once column 42 has been fully loaded, a block or a plug is manually inserted into pocket 42b of the selection member 50 to prevent additional rods from being loaded into column 42, and column 41 is loaded.

SUMMARY OF THE INVENTION

One aspect of the present invention relates to a horizontal directional drilling machine including a multi-column magazine, a feed structure for indexing rods to and from the magazine, a rotational driver for propelling rods into the ground, and a lift unit for loading the magazine by lifting rods from the feed structure into the magazine. The lift unit includes a first portion that extends beneath all of the columns of the magazine, and a second portion that projects outward from beneath the magazine toward the directional driver. A retaining structure is provided on the second portion for holding a rod on the second portion of the lift unit.

Another aspect of the present invention relates to a horizontal directional drilling machine including a magazine having a plurality of columns each having a separate bottom opening, and a feed structure for indexing rods to and from the magazine. The feed structure includes a plurality of upwardly opening pockets for receiving rods. One of the plurality of pockets comprises an end pocket. The end pocket is formed by a pivot member that can be pivoted between a raised position and a lowered position. When the pivot member is in the raised position, a rod can be held within the end pocket. By contrast, when the pivot member is in the lowered position, one side of the pocket is open such that a rod can be laterally removed from the pocket. A transfer member is provided for laterally moving a rod from the end pocket to a rotational drive head of the horizontal directional drilling machine.

Another aspect of the present invention relates to a horizontal directional drilling machine including a magazine having a plurality of columns each with a separate bottom opening, and a feed structure positioned beneath the magazine. The feed structure includes a plurality of upwardly opening pockets corresponding to the columns of the magazine. The feed structure functions to index or feed rods between the magazine and a staging location. The feed structure also includes a rod holder for picking up rods at the staging location, and a drive mechanism for moving the feed structure such that a rod held by the rod holder can be moved from the staging location to a rotational drive head of the drilling machine. Thus, the feed structure provides both an indexing function and a rod transport function. The feed structure can also be used to convey rods from the rotational drive head to the magazine during a pull-back sequence of the directional drilling machine. A lift is preferably provided for lifting the rods up and down relative to the magazine.

A variety of advantages of the invention will be set forth in part in the description that follows, and in part will be apparent from the description, or may be learned by practicing the invention. It is to be understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows.

DETAILED DESCRIPTION

With reference now to the various drawings in which identical elements are numbered identically throughout, a description of various exemplary aspects of the present invention will now be provided.

Figure 1:
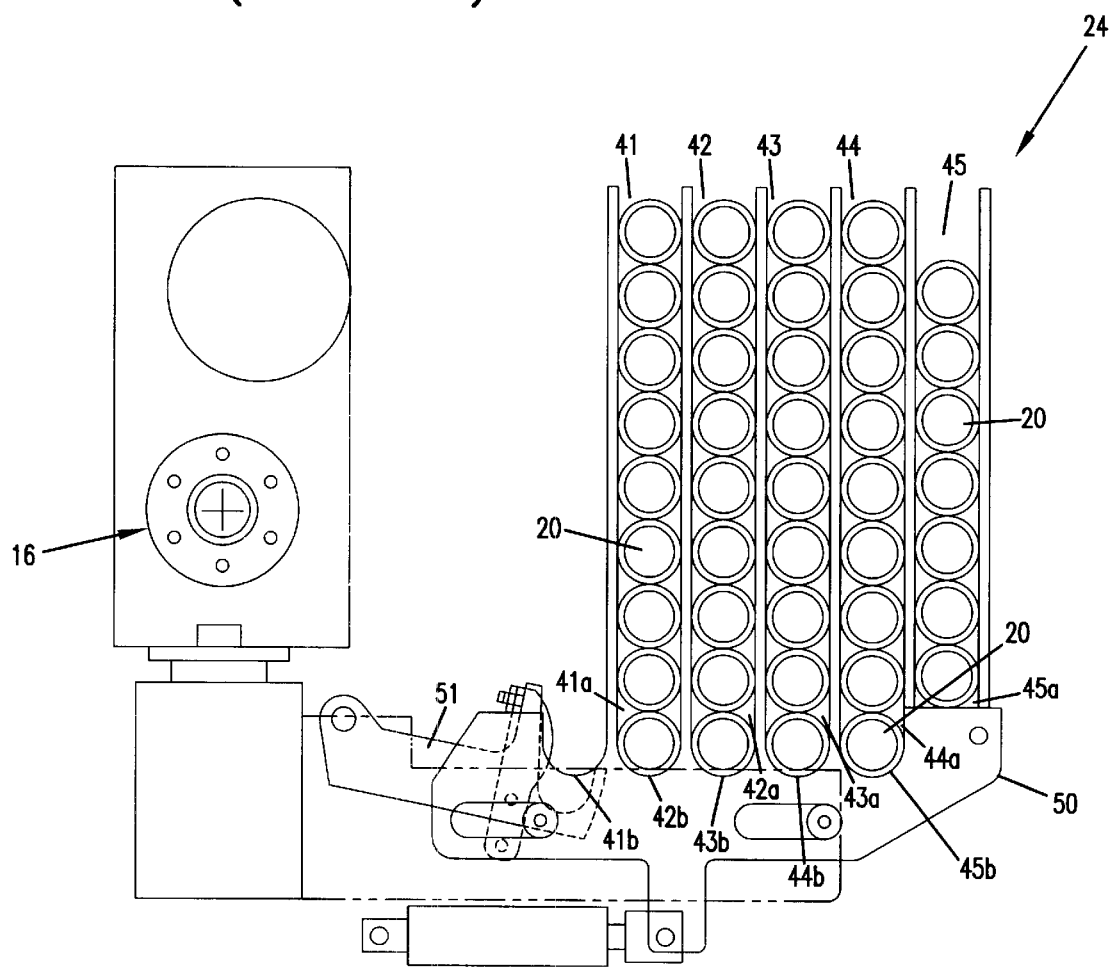
FIG. 1 illustrates a prior art rod handling apparatus.
Figure 2A:
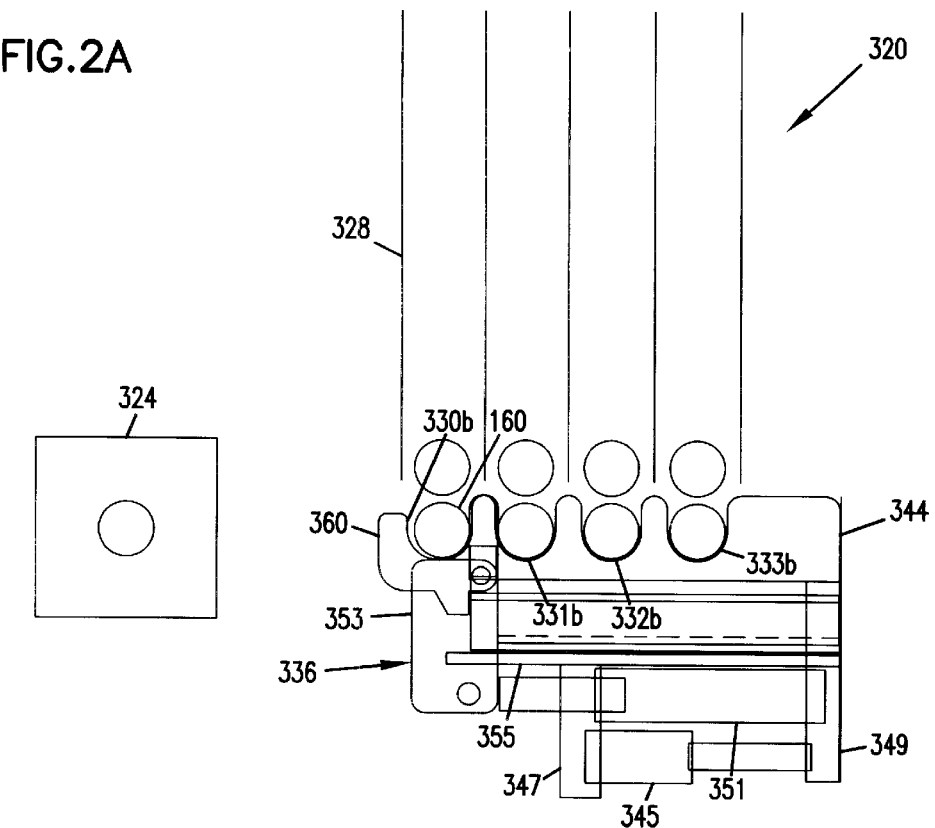
FIGS. 2a–2c illustrate a rod indexing and transfer arrangement constructed in accordance with the principles of the present invention.
Figure 2B:
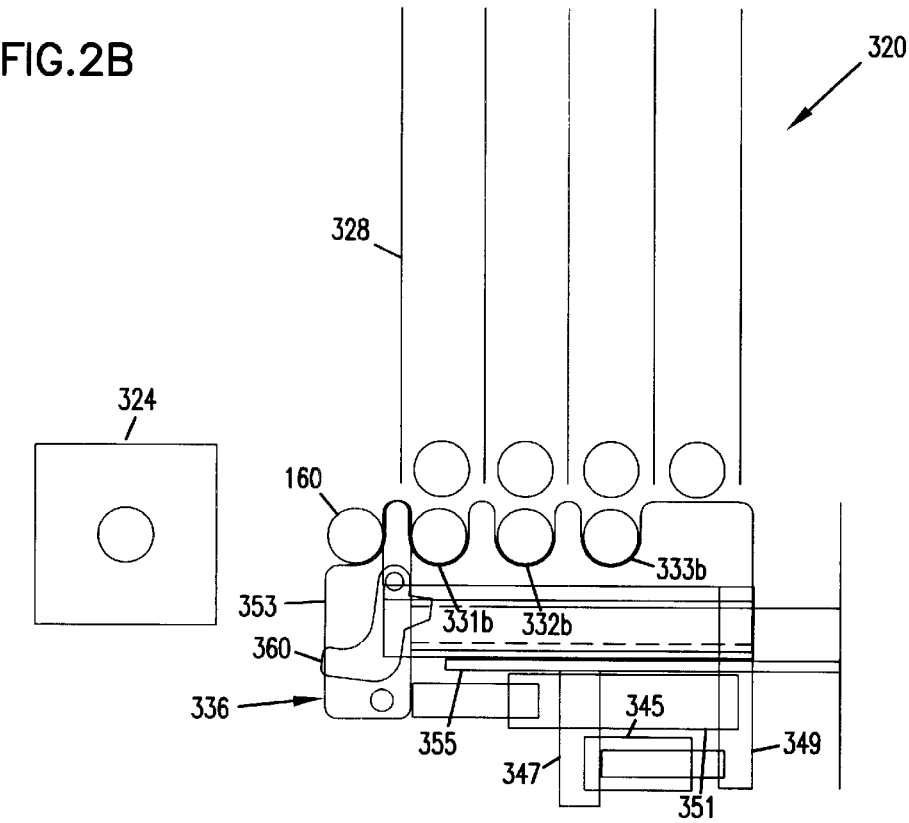
Figure 2C:
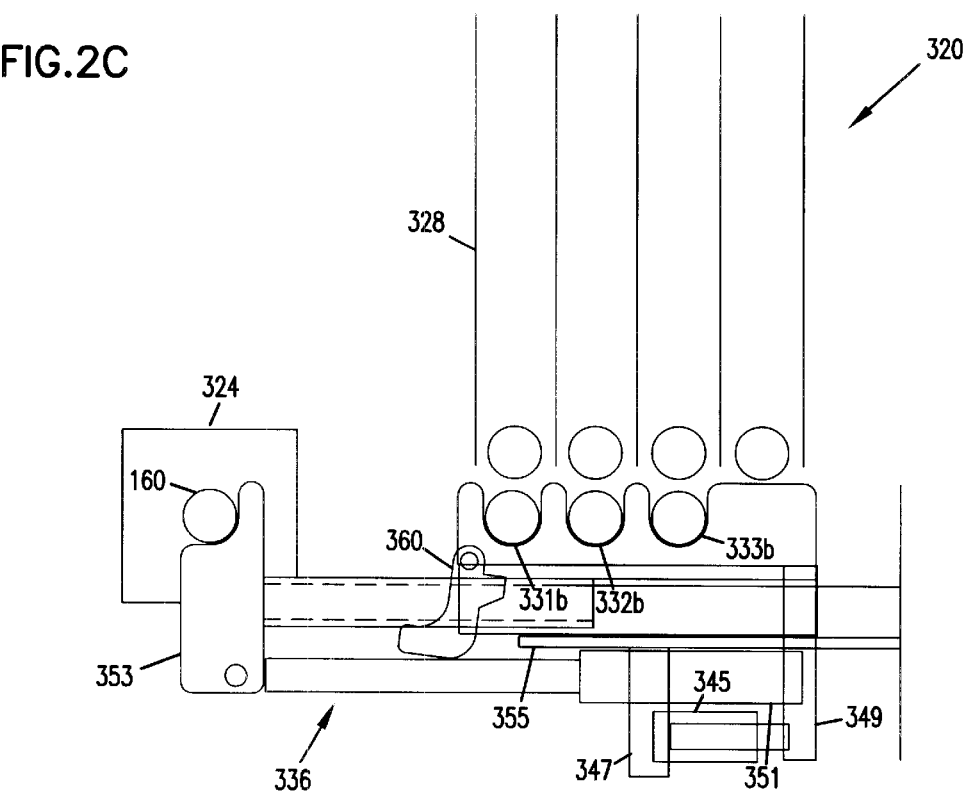

FIGS. 2a–2c illustrate a horizontal directional drilling machine 320 constructed in accordance with the principles of the present invention. The drilling machine 320 includes a multi-pocket feed structure 344 (i.e., a feed member or indexing member) for indexing rods from beneath a rod box 328, and a rod transfer mechanism 336 for moving rods between the feed structure 344 and a rotational drive head 324 (i.e., a rotational driver for driving a drill string into the ground and for pulling a drill string from the ground). The feed structure 344 is movable between an extended orientation (shown in FIG. 2b) and a retracted orientation (shown in FIG. 2a). As depicted in the Figures, a hydraulic cylinder 345 is used to extend and retract the feed structure 344. The cylinder 345 is connected between a first support 347 connected to a frame 355 of the horizontal directional drilling machine, and a second support 349 connected to the feed structure 344. The rod transfer mechanism 336 is shown driven by a hydraulic cylinder 351 having one end connected to the support 349, and the opposite end connected to a rod holder element 353. The hydraulic cylinder 351 moves the rod holder 353 between a retracted orientation (shown in FIG. 2b) and an extended orientation (shown in FIG. 2c). Since both hydraulic cylinders 345 and 351 are connected to the support 349, movement of the cylinder 345 causes both the feed structure 344 and the rod transfer member 336 to move in unison with one another.

The feed structure 344 defines four upwardly opening pockets 330b–333b. The pocket 330b is at least partially formed by a pivot member 360. When the feed structure 344 is in the retracted position of FIG. 2a, the pivot member 360 is held in an upper position by engagement with the frame 355. By contrast, when the feed structure 344 is extended as shown in FIG. 2b, the pivot member 360 disengages from the frame and moves to a lower position via gravity.

To remove a rod 160 from the rod box 328, the feed structure 344 is retracted and rods are lowered into the pockets 330b–333b (e.g., by a hydraulic lift) as shown in FIG. 2a. When the rods are lowered, the rod holder 353 of the rod transfer mechanism 336 is positioned behind the pocket 330b of the feed structure 344. Next, the cylinder 345 moves the rod transfer member 336 and the feed structure 344 in unison to the position of FIG. 2b. As the feed structure 344 moves to the position of FIG. 2b, the pivot member 360 pivots downward via gravity. The rod transfer mechanism 336 is then extended; as shown in FIG. 2c, to carry the rod from the rod box 328 to the rotational driver 324 of the horizontal directional drilling machine. After delivery of the rod, the rod transfer mechanism 336 and the feed structure 344 are returned to the position of FIG. 2a to select another rod from the rod box 328.

To load rods from the drill string back to the rod box 328, the above described sequence is reversed. For example, the rod transfer mechanism 336 is initially extended to pick up a rod from the drill string as shown in FIG. 2c. Next, the rod transfer mechanism 336 is retracted to the position of FIG. 2b. Subsequently, the rod transfer mechanism 336 and the feed structure 344 are concurrently retracted to the position of FIG. 2a. In the position of FIG. 2a, rods held in the pockets 330b–333b can be lifted back into the rod box 328 (e.g., by a hydraulic lift).

FIGS. 3a–3n and 4a–4l illustrate another directional drilling machine 420 constructed in accordance with the principles of the present invention. The drilling machine 420 includes a rotational driver 424 having a drive chuck 425. The directional drilling machine 420 also includes a rod box 428 having five vertical columns 430a–434a. A feed structure 444 (i.e., a feed member or indexing member) is positioned beneath the rod box 428. The feed structure 444 includes five upwardly opening pockets 430b–434b. The feed structure 444 also includes a partial pocket 435 positioned at the end of the feed structure 444 closest to the rotational driver 424. Preferably, the partial pocket 435 includes a rod holder such as a magnet, mechanical gripper, or retractable finger for holding a rod at least temporarily in the partial pocket 435. The feed structure 444 is extended and retracted by conventional techniques (e.g., a cylinder, a rack and pinion drive, a chain drive, etc.).

An important aspect of the embodiment of FIGS. 3a–3n and 4a–4l is that the feed structure 444 is used to: (1) index or cycle rods to and from the rod box 428; and (2) transfer rods between a staging location adjacent the rod box 428 and the rotational driver 424.

Figure 3A:
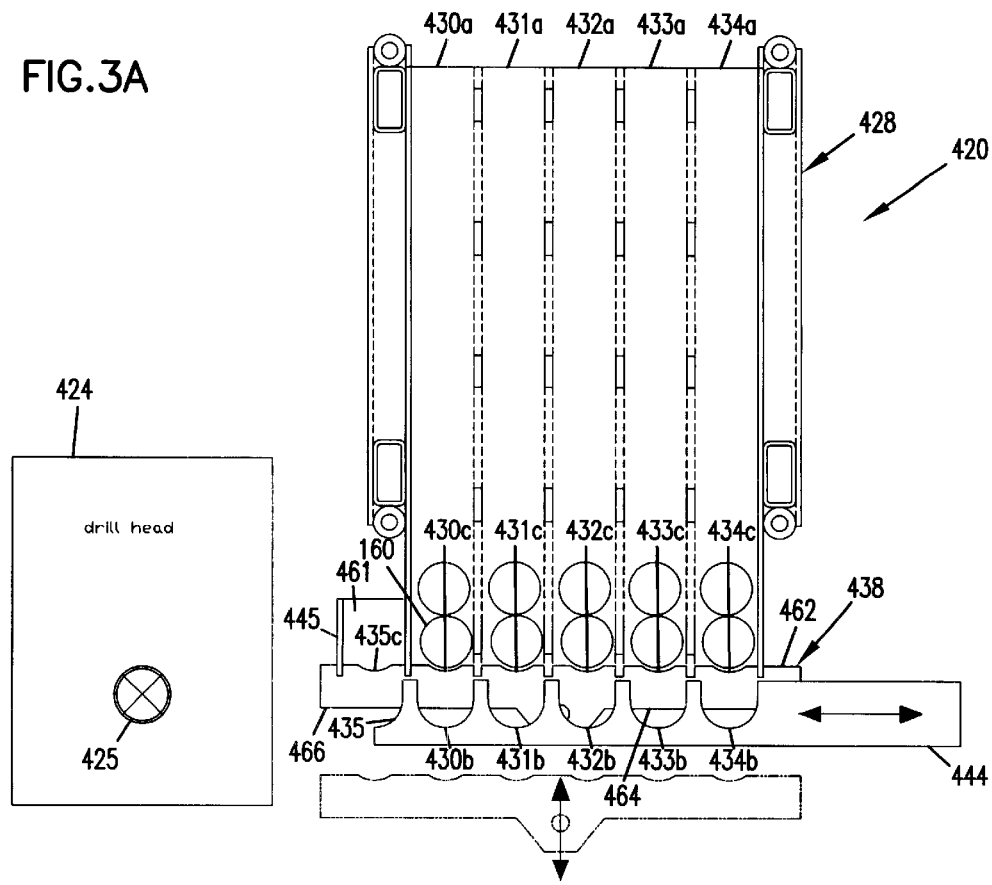
FIGS. 3a–3n illustrate an alternative rod handling apparatus, the apparatus is shown moving rods from the magazine to a rotational drive head.

As shown in FIG. 3a, the directional drilling machine 420 also includes a lift 438 for raising and lowering the rods relative to the rod box 428. The depicted lift 438 can be moved between a raised position and a lowered position (shown in phantom line) by any number of conventional structures. For example, one or more hydraulic cylinders can be used to raise and lower the lift 438. Alternatively, the lift could be raised and lowered by a hydraulic actuator, an electric actuator, a chain drive, a rack and pinion drive, or any number of other drive configurations.

The lift 438 includes a top piece 462 having a first portion 464 and a second portion 466. The first portion 464 extends beneath the rod box 428, and the second portion 466 extends laterally outward beyond the bottom of the rod box 428. The first portion 464 defines five rod cradling recesses 430*c*–434*c*, and the second portion 466 also defines a rod cradling recess 435*c*. When the rod box 428 is mounted on the directional drilling machine 320, the pipe cradling recesses 430*c*–434*c* respectively align with the columns 430*a*–433*a* of the rod box 428, and the recess 435*c* is laterally offset from the rod box 428. The location of the rod holding recess structure 435*c* facilitates its use as a rod staging location for temporarily holding rods as they are transferred between the feed structures 444 and the transfer mechanisms 436. For clarity, the lift 438 is depicted in FIG. 3*a*, but omitted from the remainder of the Figures.

While recesses has been shown for holding or cradling rods on the top piece 462 of the lift 438, it will be appreciated that other structures for retaining rods (e.g., lips, mechanical grippers, flanges, fingers, stops, etc.) can also be used. For example, as shown in FIG. 3*a*, a fixed stop 445 (e.g., a wall or barrier) attached to the frame or the magazine at a location adjacent to the end of the second portion 466 could also be used.

Figure 3B:
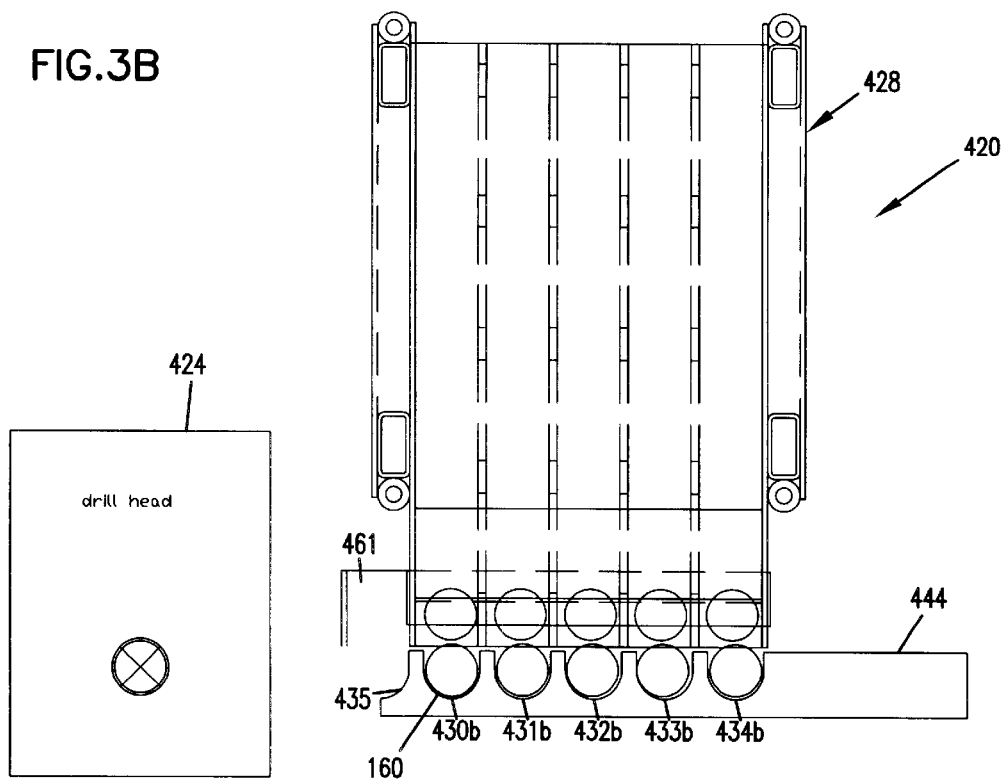
Figure 3C:
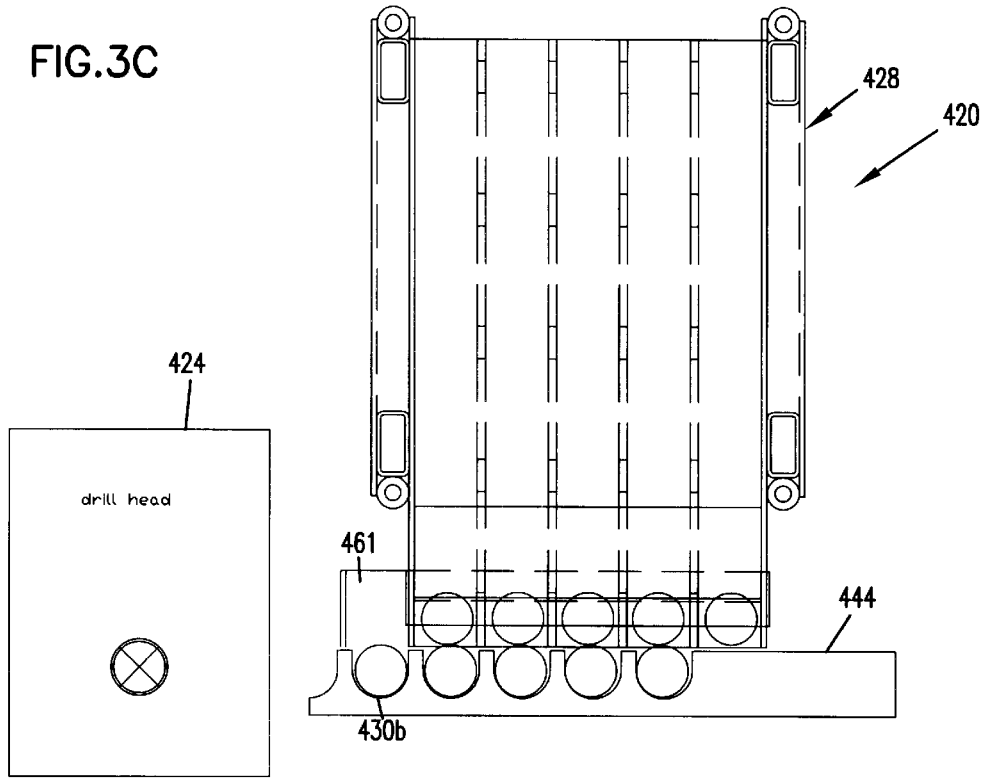
Figure 3D:
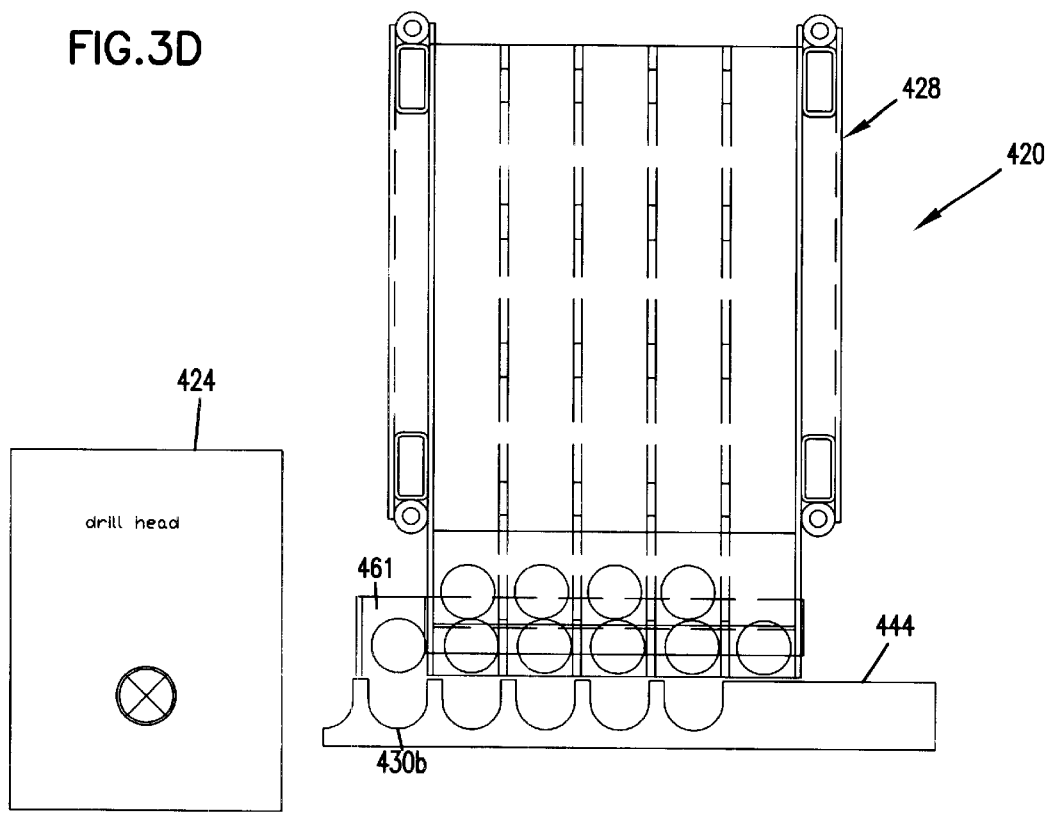
Figure 3E:
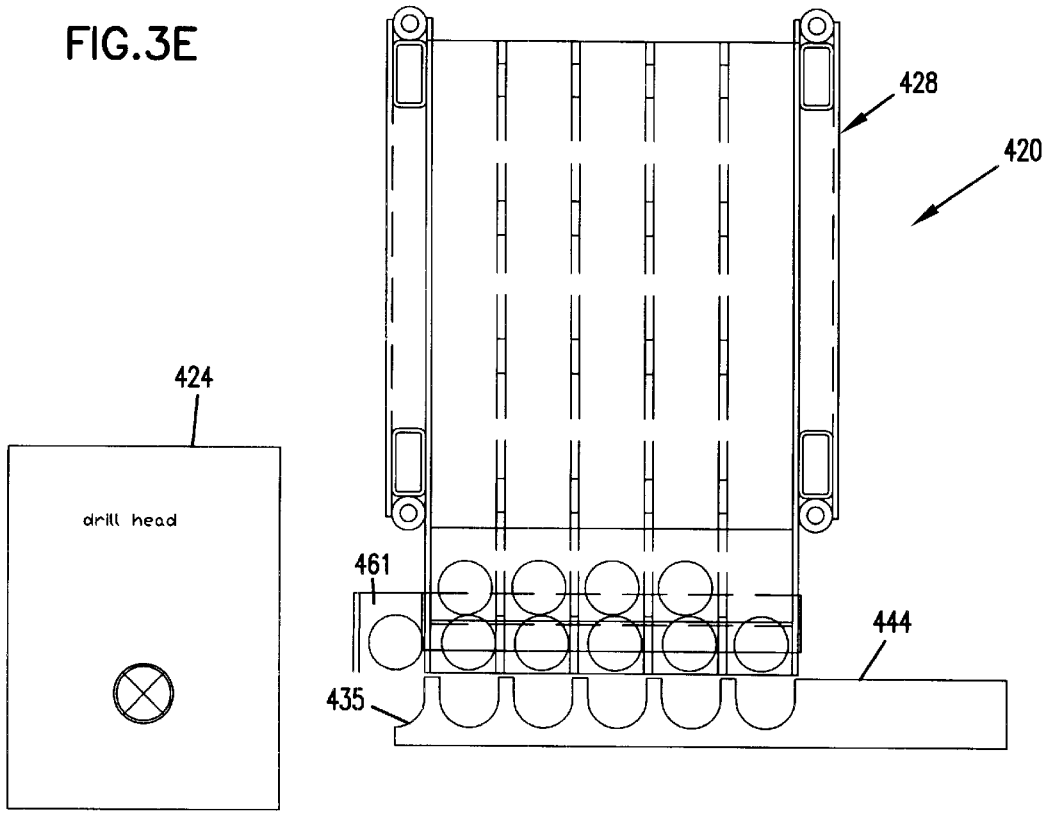
Figure 3F:
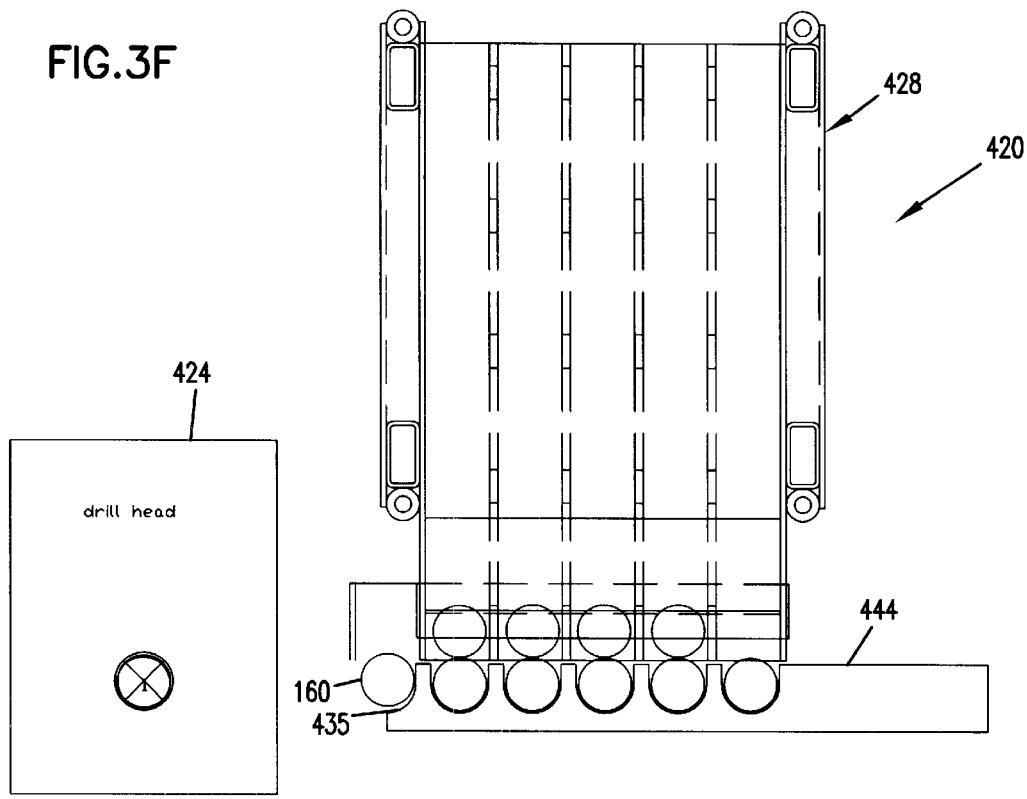

To transfer a rod 160 from the rod box 428 to the rotational driver 425, the feed structure 444 is initially retracted beneath the rod box 428 as shown in FIG. 3*a*. Next, the rods within the rod box 428 are lowered into the pockets 430*b*–434*b* as shown in FIG. 3*b*. The feed structure 444 is then moved one position to the left such that the pocket 430*b* aligns with a staging location 461 (see FIG. 3*c*). With the pocket 430*b* aligned beneath the staging location 461, the rods are lifted upward from the rod transfer structure 444 as shown in FIG. 3*d*. Once the rods have been elevated above the rod transfer structure 444, the rod transfer structure 444 is retracted one position as shown in FIG. 3*e*. The rods are then lowered toward the feed structure 444 such that rod 160 is received at the partial pocket 435 of the feed structure 444 as shown in FIG. 3*f*.

Figure 3G:
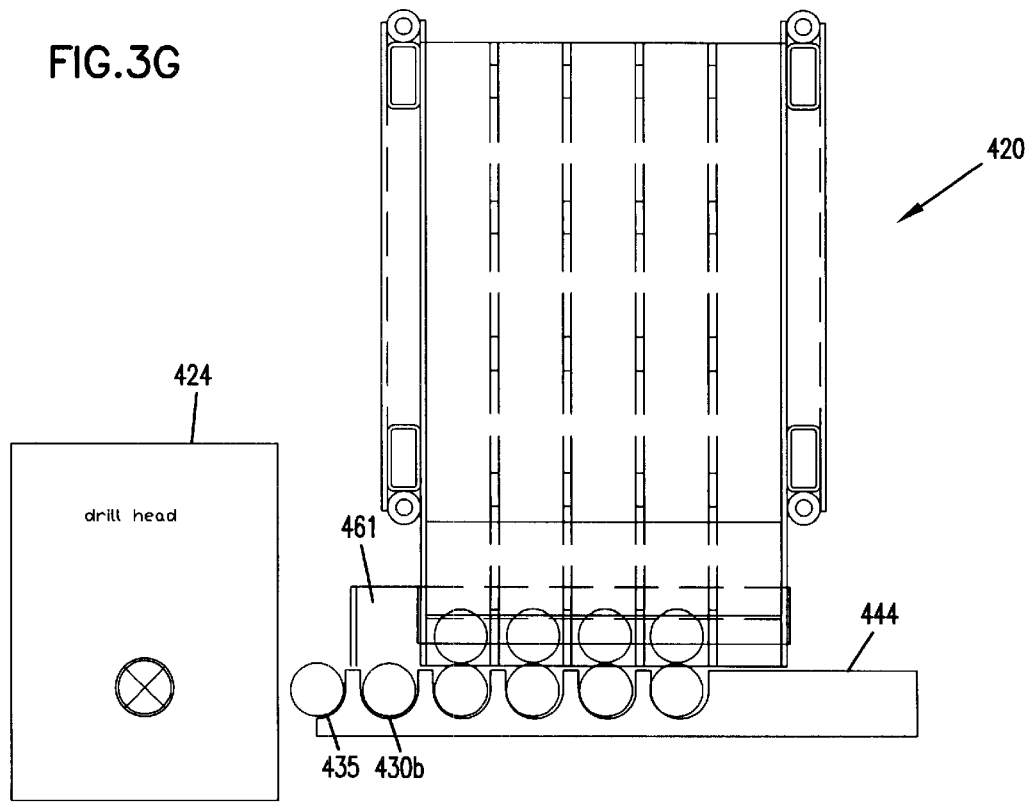
Figure 3H:
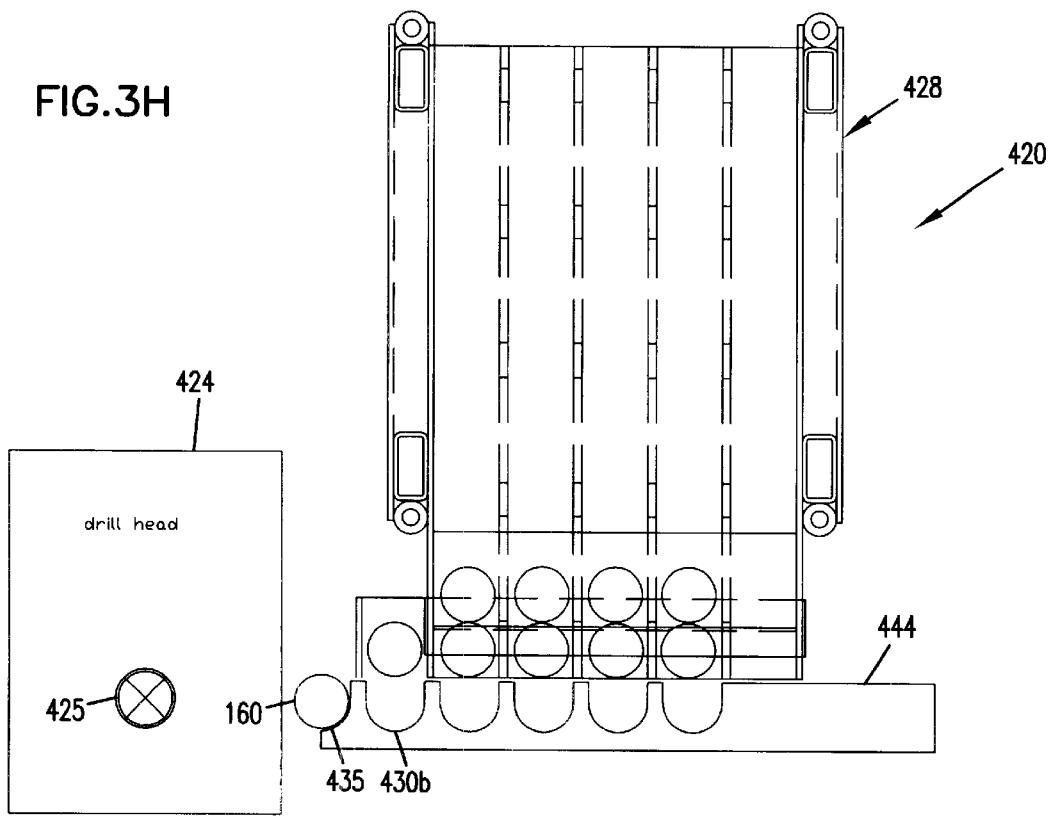
Figure 3I:
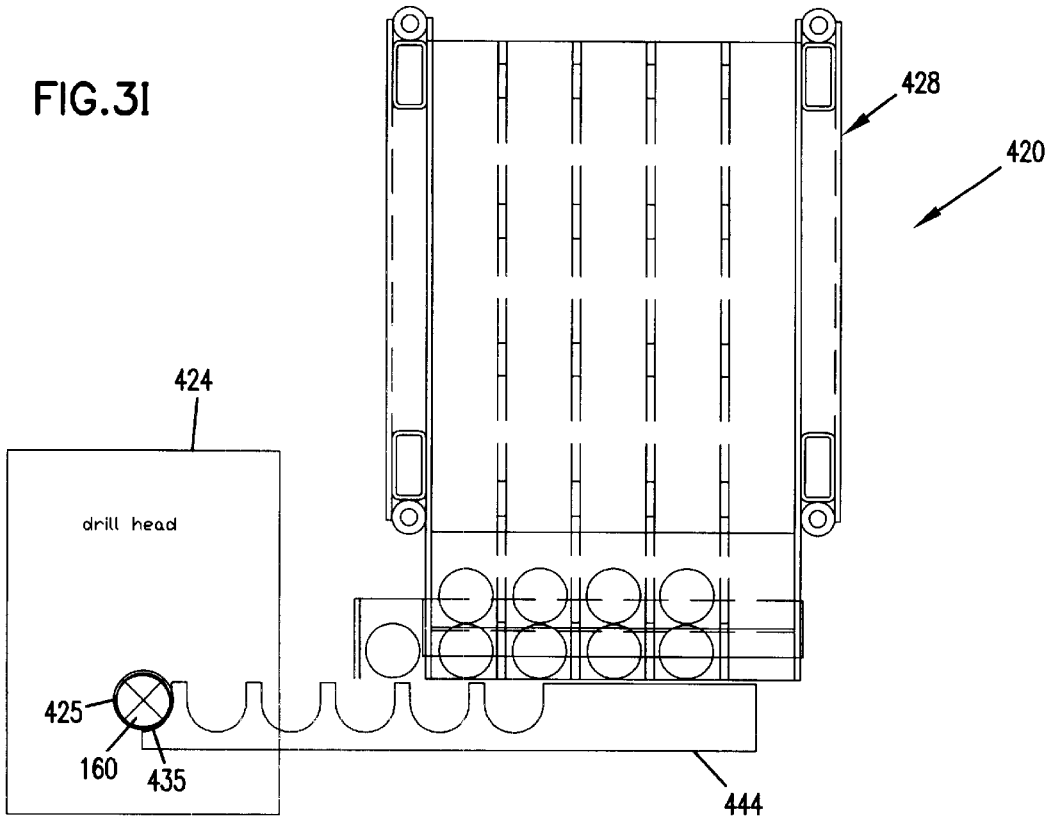

After lowering the rod back to the feed structure 444, the feed structure is indexed one position to the left such that the pocket 430*b* again aligns with the staging location 461 (see FIG. 3*g*). With the feed structure 444 so positioned, the rods are again lifted upward as shown in FIG. 3*h*. With the feed structure 444 in the position of FIG. 3*h*, the partial pocket 435 is positioned beyond the reach of the lift structures (not shown) used to raise and lower the rods in the rod box. Consequently, rod 160 held by the partial pocket 435 is not lifted. After the rods have been lifted as shown in FIG. 3*h*, the feed structure 444 is extended to place rod 160 in alignment with the drive chuck 425 of the rotational drive head 424 (see FIG. 3*i*).

Figure 3J:
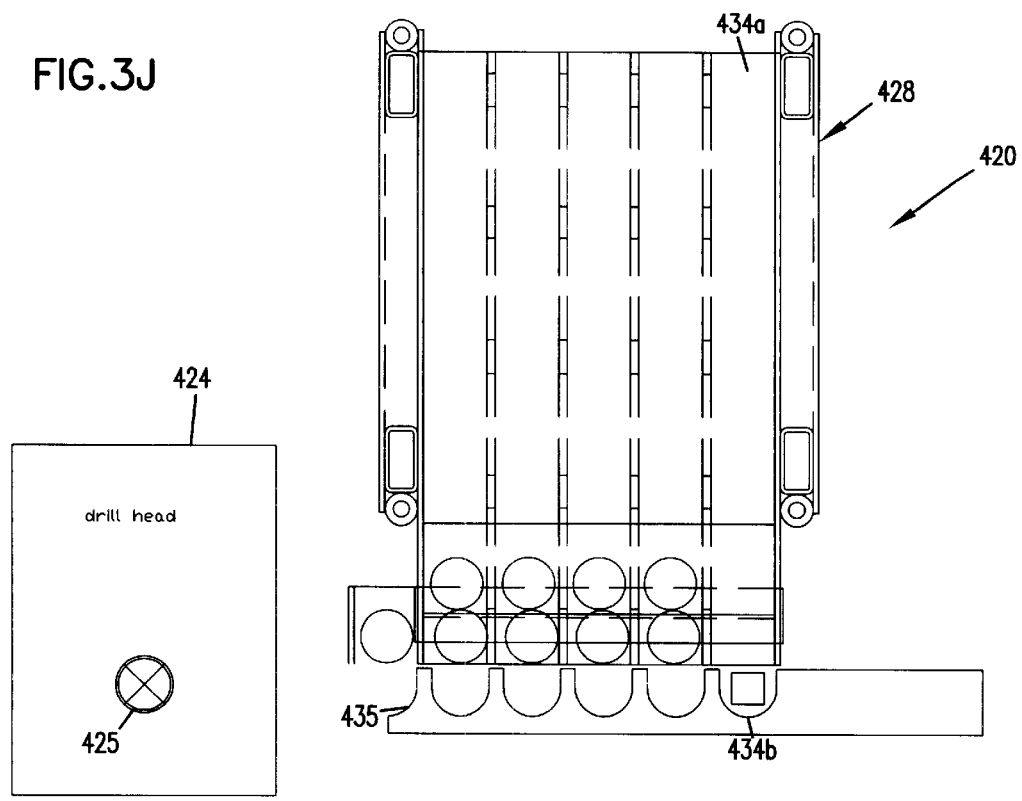
Figure 3K:
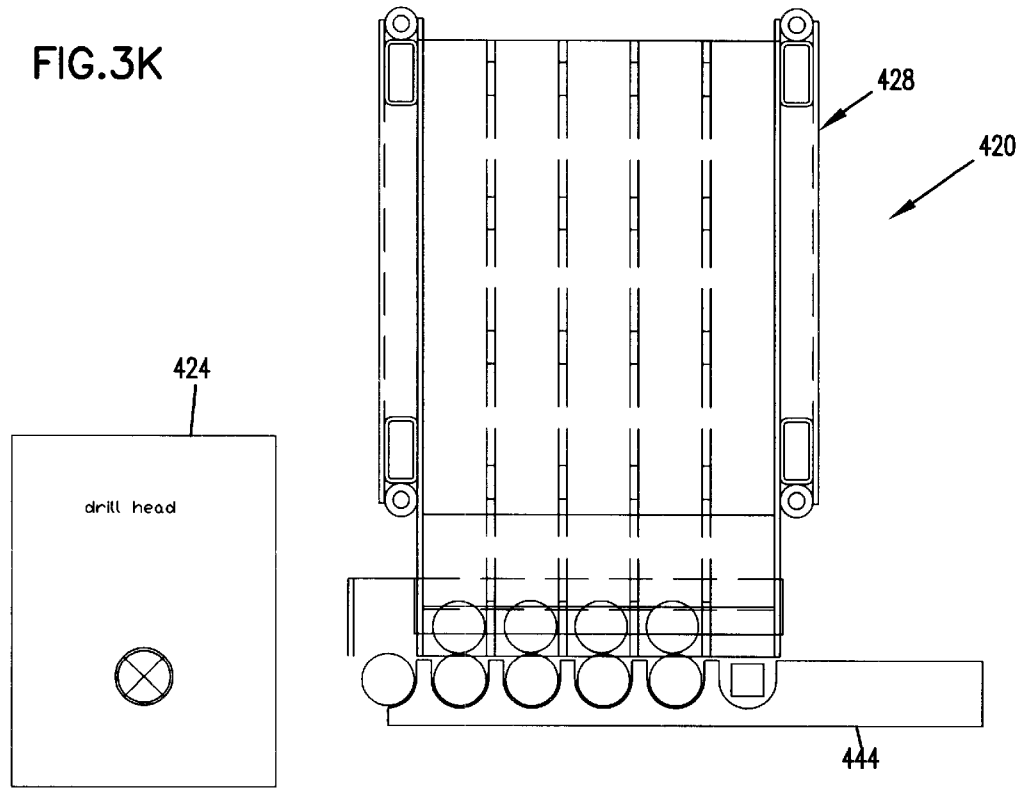
Figure 3L:
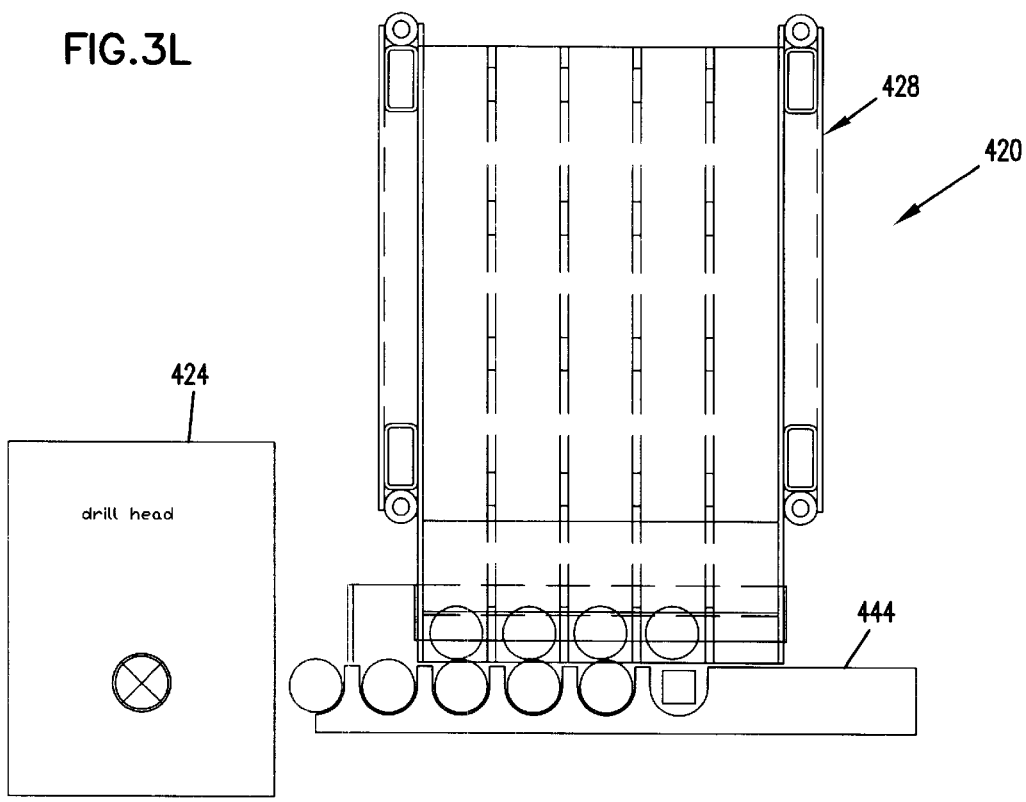
Figure 3M:
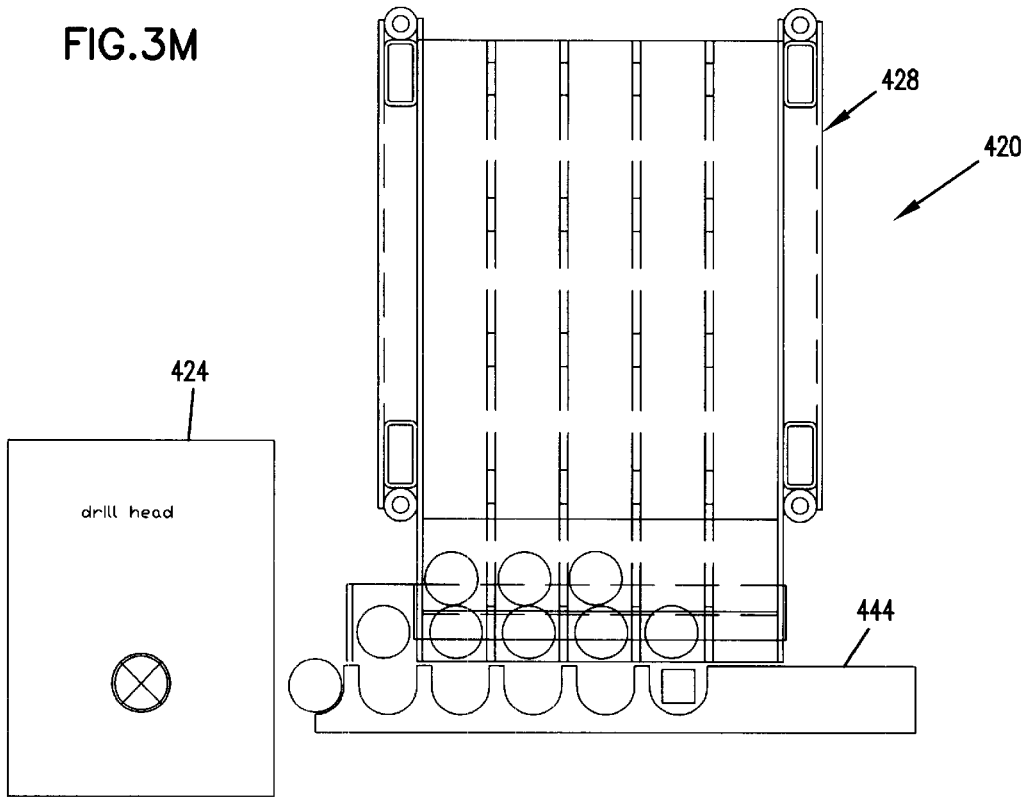
Figure 3N:
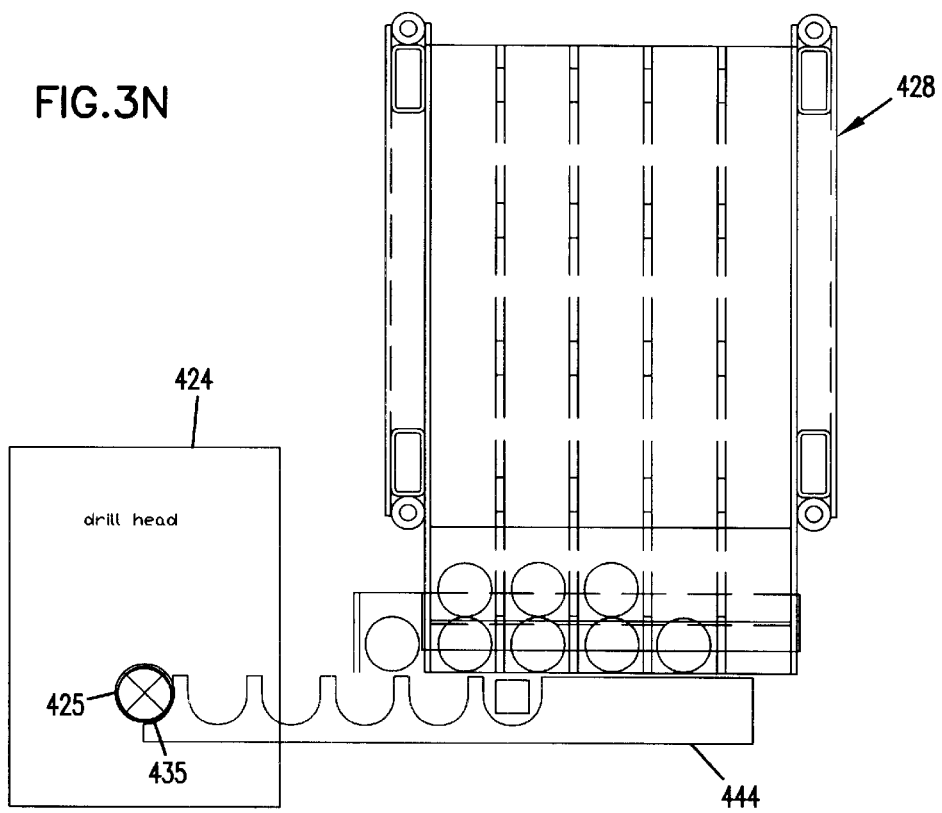

Once the rod 160 has been coupled to the drive chuck 425, the feed structure 444 is retracted to the position of FIG. 3*j* to pick up another rod from the rod box 428. As shown in FIG. 3*j*, the column 434*a* is empty, and a blocker has been placed adjacent to the pocket 434*b* to prevent pipes from falling into this pocket. After retracting the feed structure 444 to the position of FIG. 3*j*, the rods are lowered onto the feed structure 444 as shown in FIG. 3*k*. The feed structure 444 is then indexed one position to the left as shown in FIG. 3*l*, and the rods are again raised from the feed structure 444 as shown in FIG. 3*m*. Finally, the feed structure 444 is extended to bring the second rod into alignment with the drive chuck 425 as shown in FIG. 3*n*. It will be appreciated that additional rods can be unloaded from the rod box 428 in a similar manner.

Figure 4A:
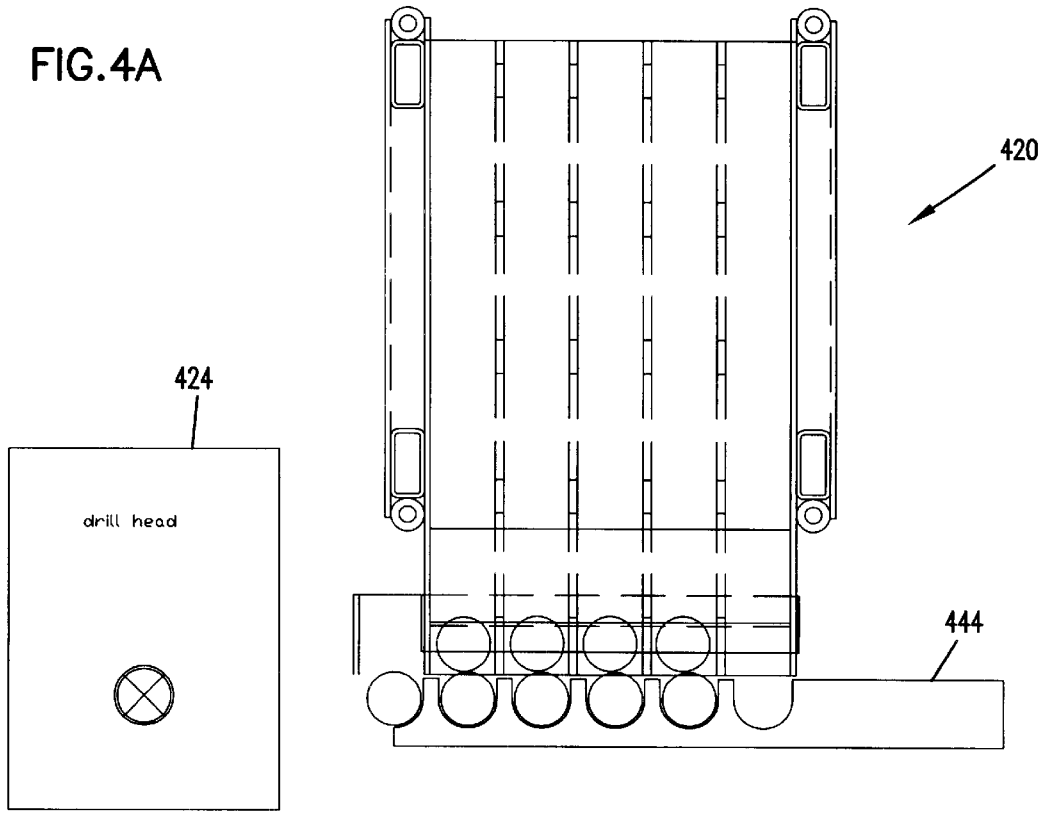
FIGS. 4a–4l illustrate the rod handling apparatus of FIGS. 3a–3n during a pull-back cycle.
Figure 4B:
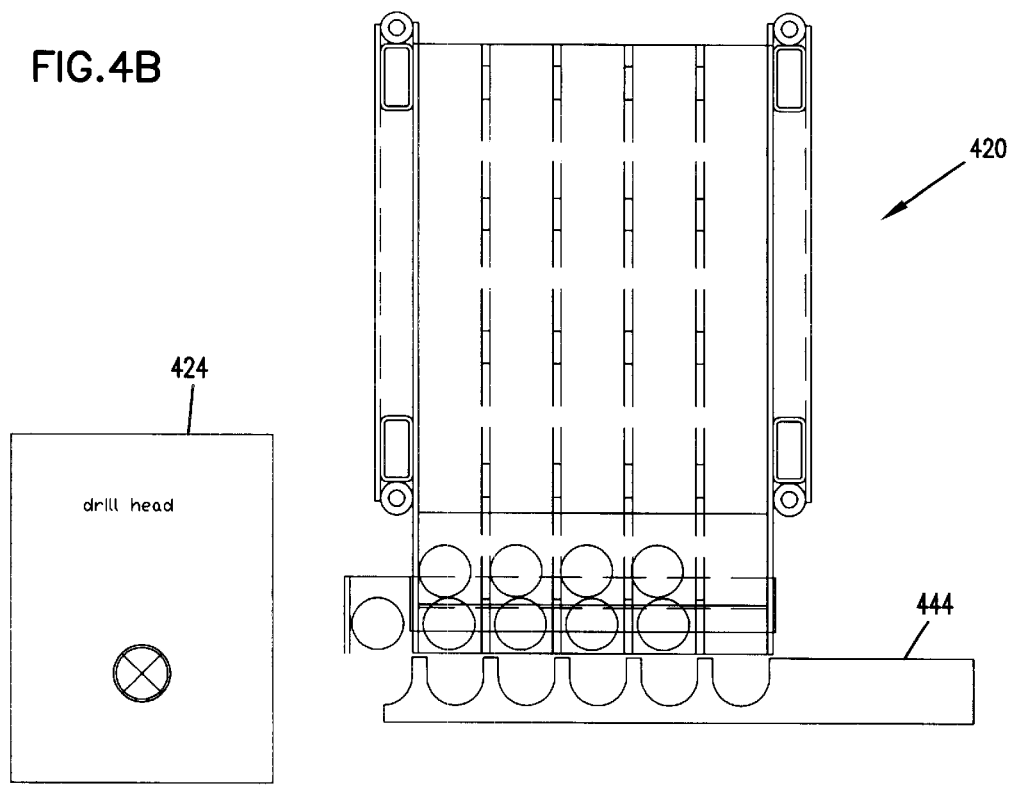
Figure 4C:
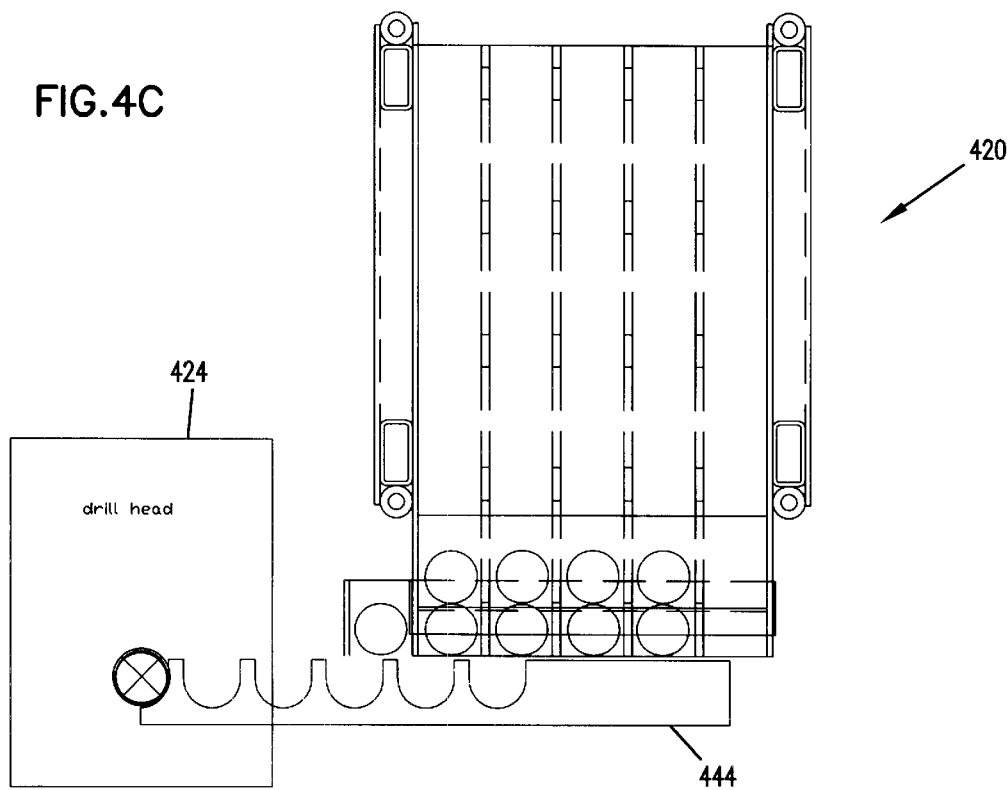
Figure 4D:
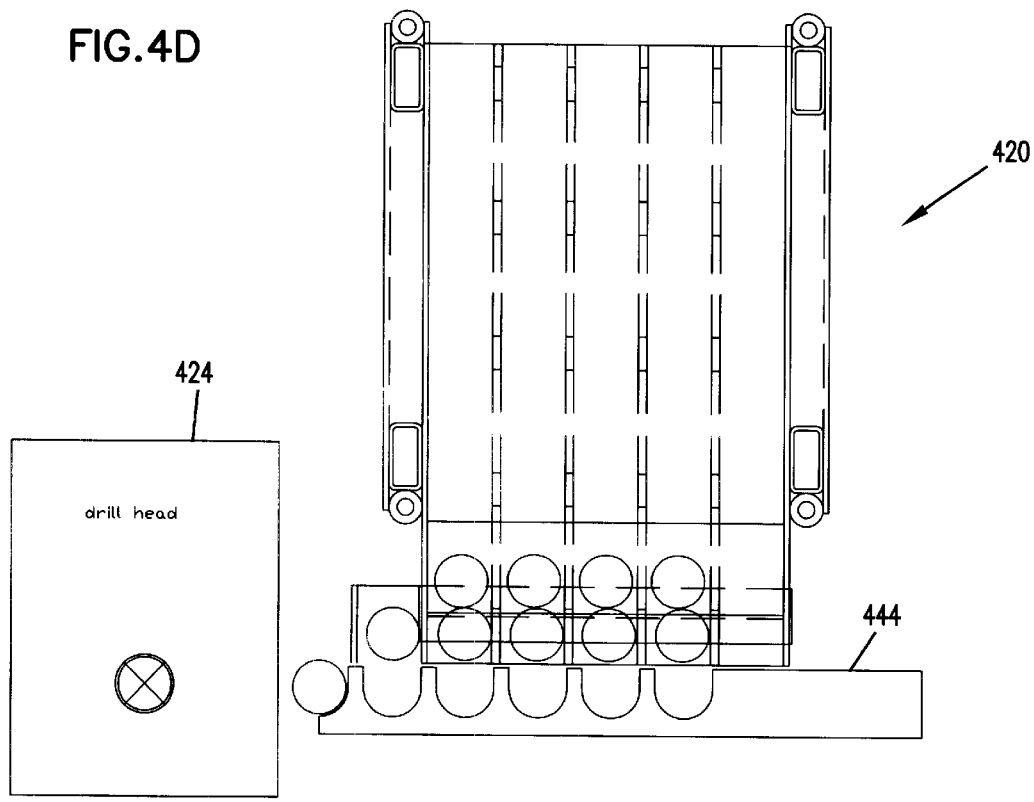
Figure 4E:
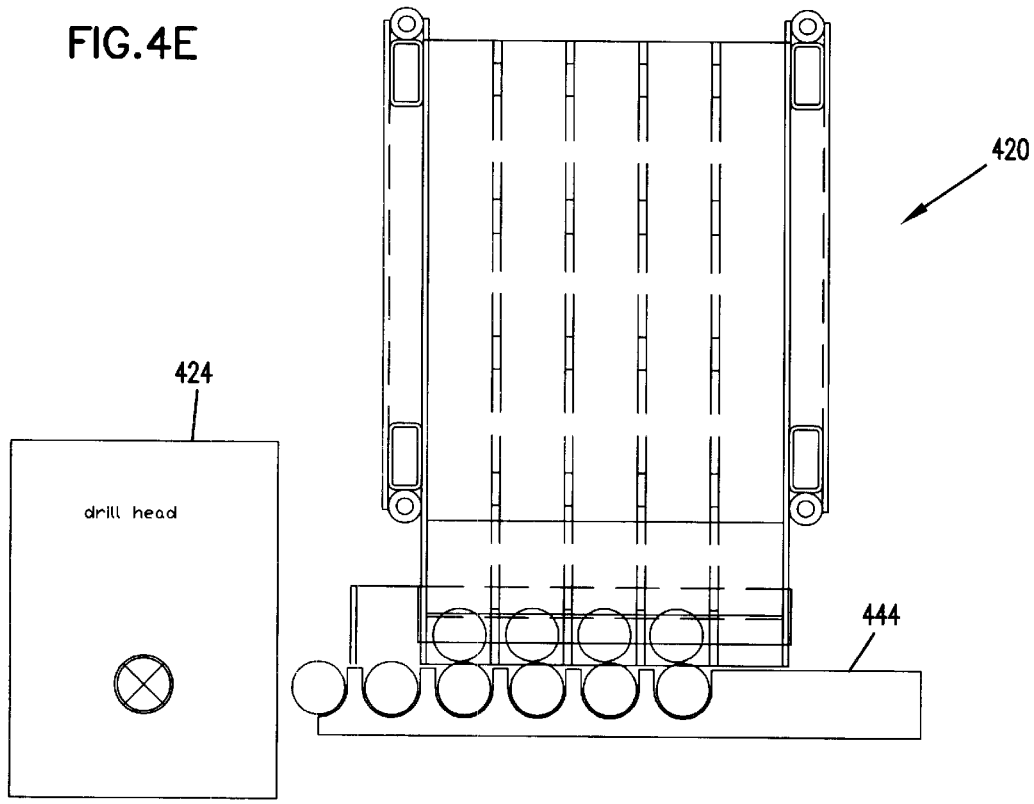
Figure 4F:
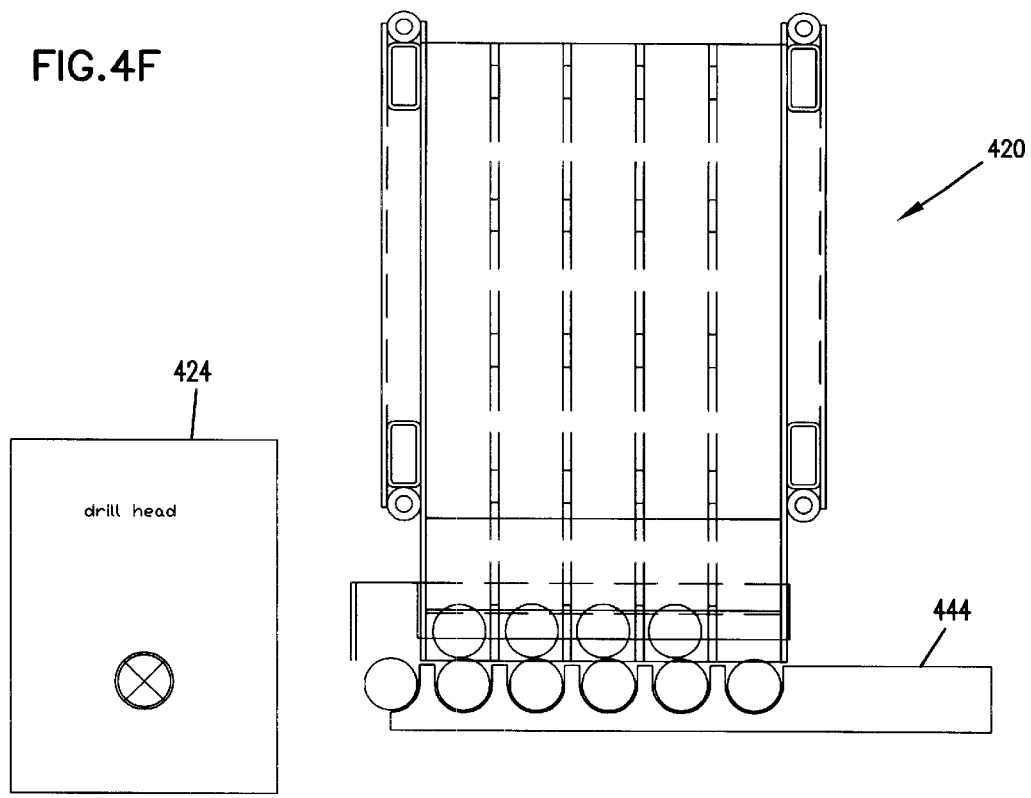
Figure 4G:
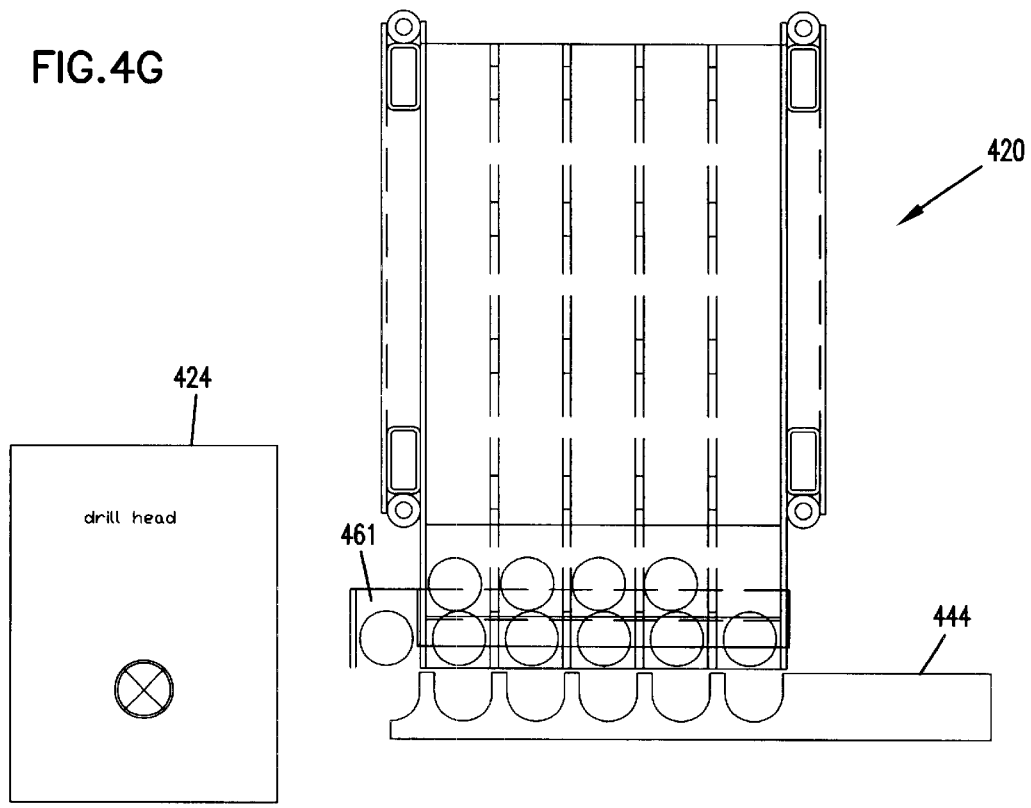
Figure 4H:
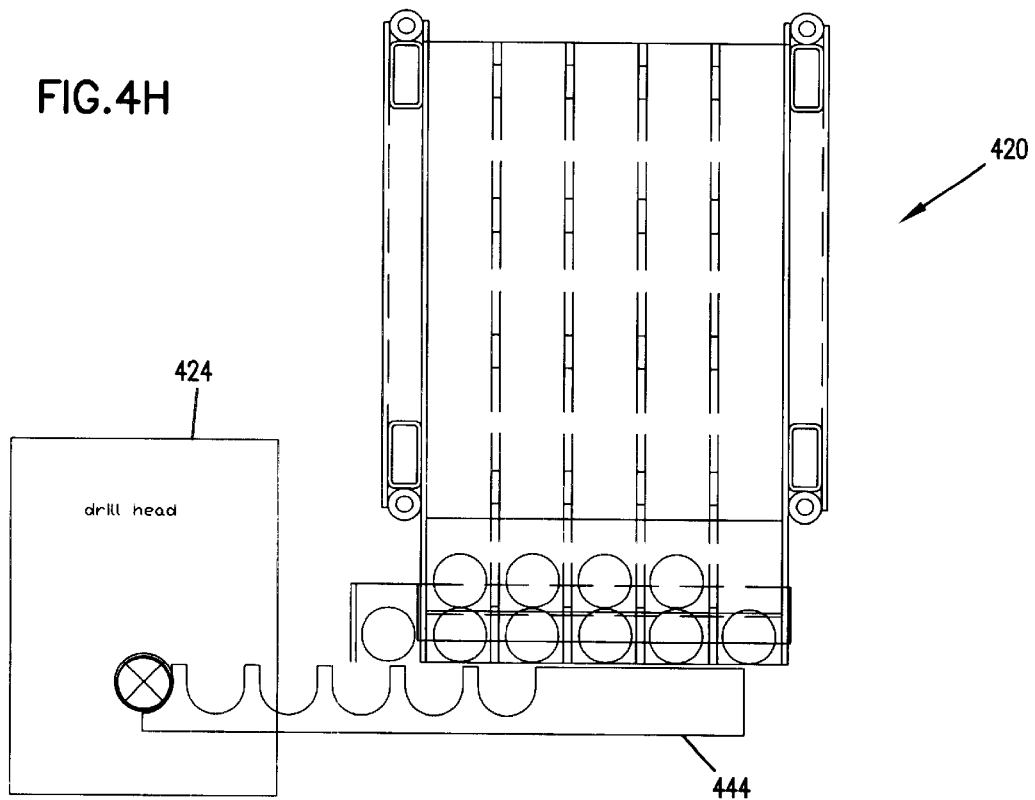
Figure 4I:
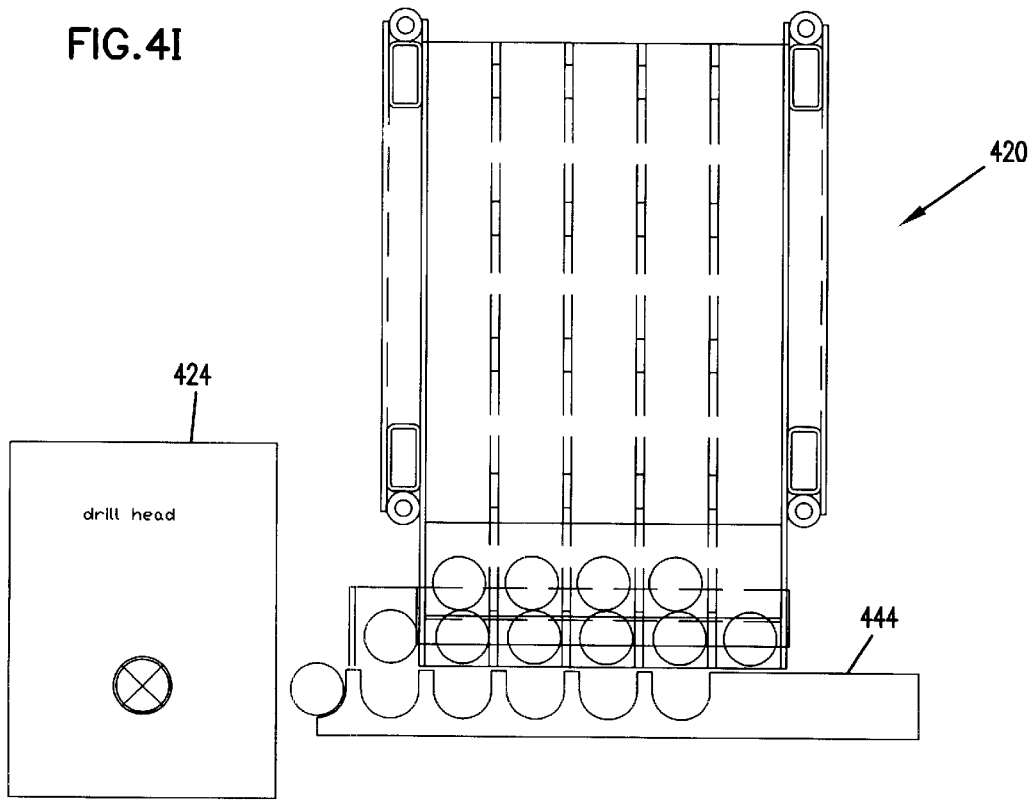
Figure 4J:
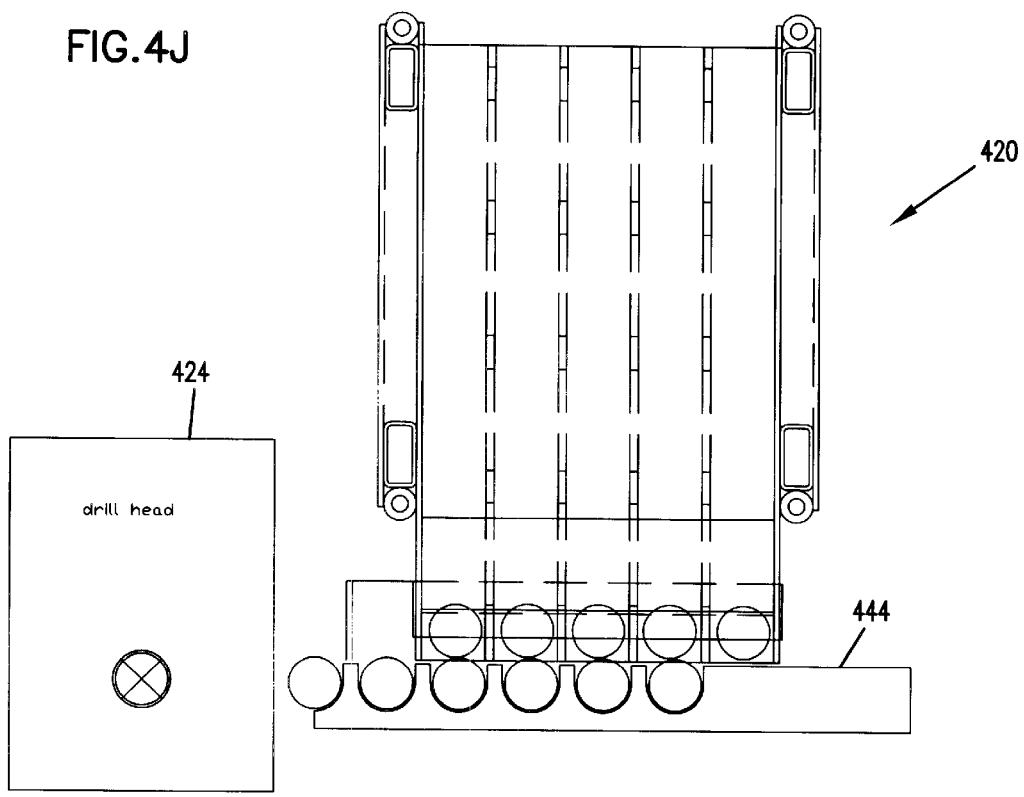
Figure 4K:
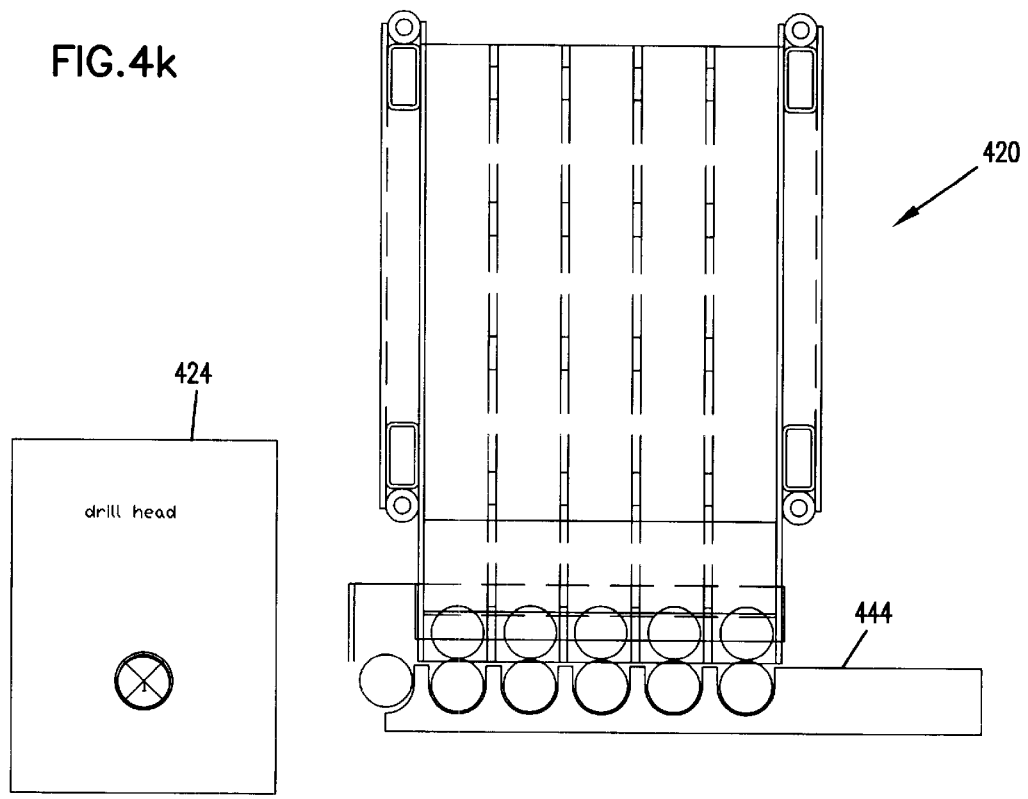
Figure 4L:
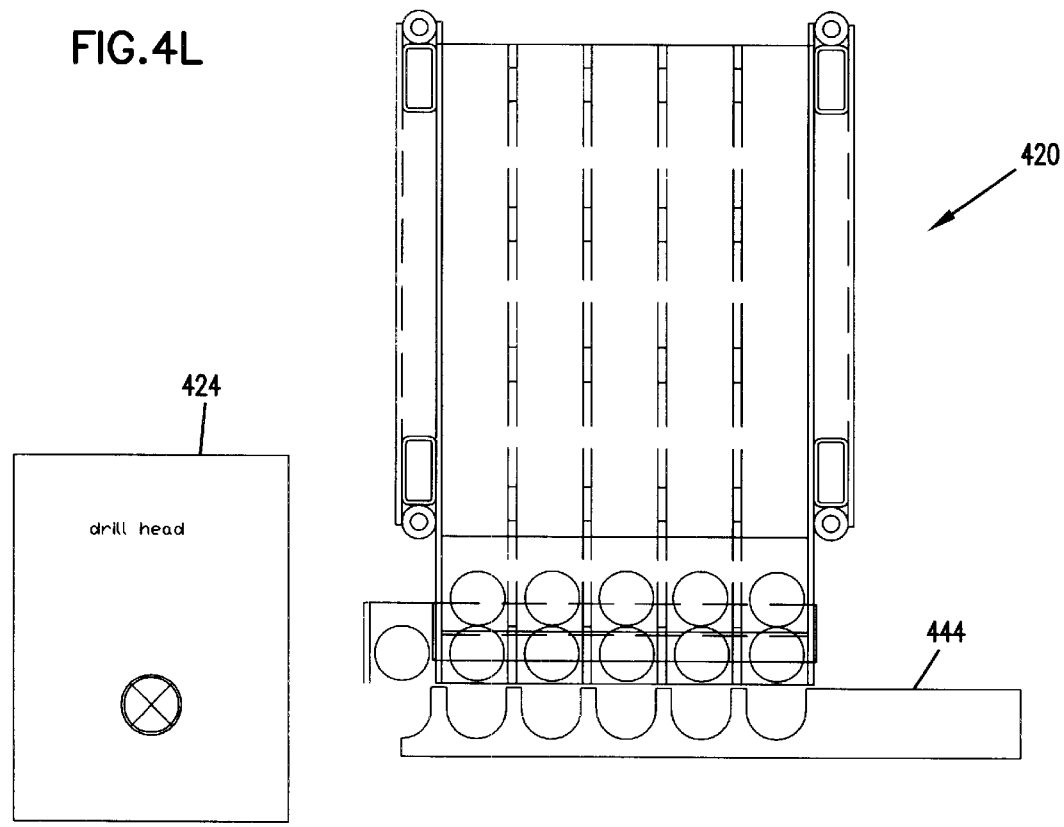

FIGS. 4*a*–4*l* show a pull-back cycle for transferring rods from the rotational drive head 424 back to the rod box 428. As shown in FIG. 4*a*, the feed structure 444 is retracted beneath the rod box 428, and the rods are in a lowered position. To initiate the sequence, the rods are raised as shown in FIG. 4*b*, and the feed structure 444 is shuttled to the left to receive a rod from the drill string as shown in FIG. 4*c*. After engaging the rod, the feed structure 444 is shuttled to the right to the position of FIG. 4*d*. Next, the rods are lowered as shown in FIG. 4*e*, and the feed structure 444 is shuttled one position to the right as shown in FIG. 4*f*. Subsequently, the rods are raised as shown in FIG. 4*g* thereby placing the rod transferred from the drill string into the staging location 461. Thereafter, the feed structure 444 is shuttled to the left to pick up another rod as shown in FIG. 4*h*. After engaging the next rod, the feed structure is retracted to the position of FIG. 4*i*, and the rods are lowered as shown in FIG. 4*j*. Finally, the feed structure 444 is shuttled one position to the right as shown in FIG. 4*k*, and the rods are again raised to push the rods back into the rod box 428 as shown in FIG. 4*l*.

The above specification and examples provide a complete description of the manufacture and use of the composition of the invention. Since many embodiments of the invention can be made without departing from the spirit and scope of the invention, the invention resides in the claims hereinafter appended.

What is claimed is:

1. A horizontal directional drilling machine comprising:
  a magazine for holding a plurality of elongated rods, the magazine including a plurality of columns in which the rods are held, each of the columns having a separate bottom opening;
  a rotational driver for driving rods into the ground;
  a feed member for feeding the rods to and from the magazine, the feed member including at least one upwardly opening pocket sized for receiving a rod, the feed member being moveable from a retracted position in which the pocket is located beneath the magazine to a staging position in which the pocket is laterally offset from the magazine in a direction toward the rotational driver; and
  a lift unit for loading the magazine by lifting the rods from the pocket of the feed member up through the bottom openings of the columns, the lift unit including a first portion that extends beneath all of the columns of the magazine and a second portion that projects laterally outward from beneath the columns to adjacent the staging position, the lift unit being moveable to lift a rod held at the staging position by the feed member to a location above the feed member; and
  a retaining structure for retaining a rod on the second portion of the lift unit.

2. The horizontal directional drilling machine of claim 1, wherein the retaining structure includes a recess located at a top surface of the second portion of the lift unit configured to receive a rod.

3. The horizontal directional drilling machine of claim 1, wherein the retaining structure includes a stop positioned adjacent a top surface of the second portion of the lift unit.

4. A horizontal directional drilling machine comprising:
a magazine for holding a plurality of elongated rods, the magazine including a plurality of columns in which the rods are held, each of the columns having a separate bottom opening; and
a lift unit for loading the magazine by lifting the rods up through the bottom openings of the columns, the lift unit including a first portion that extends beneath all of the columns and a second portion that projects outward from beneath the magazine beyond the columns.

5. The directional drilling machine of claim 4, further comprising a retaining structure for retaining a rod on the second portion of the lift unit.

6. The directional drilling machine of claim 5, wherein the retaining structure comprises a pocket.

7. A horizontal directional drilling machine comprising:
a magazine for holding a plurality of elongated rods, the magazine including a plurality of columns in which the rods are held, each of the columns having a separate bottom opening; and
a feed member that moves beneath the magazine for feeding rods to and from the magazine, the feed member having a plurality of upwardly opening pockets for receiving rods, the number of pockets being at least equal to the number of columns provided at the magazine, at least one of the pockets being at least partially defined by a rod retaining member moveable between a first position in which the rod retainer is oriented to retain a rod in the at least one pocket, and a second position in which the rod can be laterally removed from or inserted into the at least one pocket.

8. The horizontal directional drilling machine of claim 7, further comprising a rotational drive head, and a rod transfer member for moving rods between the feed member and the rotational drive head, the rod transfer member and the feed member moving along substantially parallel paths.

9. A horizontal directional drilling machine comprising:
a magazine for holding a plurality of elongated rods, the magazine including a plurality of columns in which the rods are held, each of the columns having a separate bottom opening; and
an elongated feed member that moves beneath the magazine for feeding rods to and from the magazine, the feed member having a plurality of upwardly opening pockets for receiving rods, the number of pockets being at least equal to the number of columns provided at the magazine;
a rotational drive head;
a staging location positioned adjacent the magazine for holding one or more rods; and
a rod holder positioned adjacent one end of the feed member, the feed member being movable from a first position where the rod holder is adjacent the staging location to a second position where the rod holder is oriented to hold a rod in alignment with the rotational drive head.

10. A horizontal directional drilling machine comprising:
a magazine for holding a plurality of elongated rods, the magazine including a plurality of columns in which the rods are held, each of the columns having a separate bottom opening; and
a plurality of feed members that move laterally between a retracted and an extended position beneath the magazine for feeding rods to and from the magazine, each of the feed members having:
  i) a first end and a second end, the first end being opposite the second end, the first end including a blocking surface capable of blocking one column; and
  ii) a plurality of upwardly opening pockets, including a first pocket for receiving rods, the number of pockets on each feed member being at least equal to the number of columns provided at the magazine, the first pocket being located on the second end, the first pocket further being a partial pocket.

11. The horizontal directional drilling machine of claim 10 wherein each of feed members further comprises a rod retaining member coupled adjacent the first partial pocket, the rod retaining member being moveable between:
  a) a first position in which the rod retainer is oriented to retain a rod in the partial pocket when the feed member is in the retracted position as defined by the position where the pockets of the feed member are oriented in alignment with the bottom opening of the columns of the magazine, and
  b) a second position in which the rod can be laterally removed from or inserted into the partial pocket when the feed member is in the extended position where the feed member has been moved laterally such that the blocking surface is in alignment with the one column.

12. The horizontal directional drilling machine of claim 11 wherein each of the feed members is moveable between three positions, including:
  a) the retracted position wherein the partial pocket is aligned with a staging area located laterally offset from the magazine, while at the same time, the remaining pockets are located beneath the magazine;
  b) an intermediate position wherein a pocket closest to the partial pocket is aligned with the staging area; and
  c) the extended position wherein the partial pocket is positioned such that the axis of a rod carried within the partial pocket is aligned with a drill string axis.

13. The horizontal directional drilling machine of claim 1 wherein the feed member is configured to move a rod to a position in alignment with the rotational driver.

* * * * *